Edgar Hitt & Andrew Lent's Imp'd Machine for Upsetting Tire.

No. 120,521.  Patented Oct. 31, 1871.

Witnesses.
E. Bilhuber.
C. Wahlers.

Inventors.
Edgar Hitt
Andrew Lent
per
Van Santvoord & Hauff
Attys 121,521

UNITED STATES PATENT OFFICE.

EDGAR HITT AND ANDREW LENT, OF KATONAH, NEW YORK.

IMPROVEMENT IN MACHINES FOR UPSETTING TIRES.

Specification forming part of Letters Patent No. 120,521, dated October 31, 1871.

*To all whom it may concern:*

Be it known that we, EDGAR HITT and ANDREW LENT, of Katonah, in the county of Westchester and State of New York, have invented a new and Improved Machine for Upsetting Tire; and we do hereby declare the following to be a full, clear, and exact description thereof, which will enable those skilled in the art to make and use the same, reference being had to the accompanying drawing forming part of this specification, in which drawing—

Figure 1:
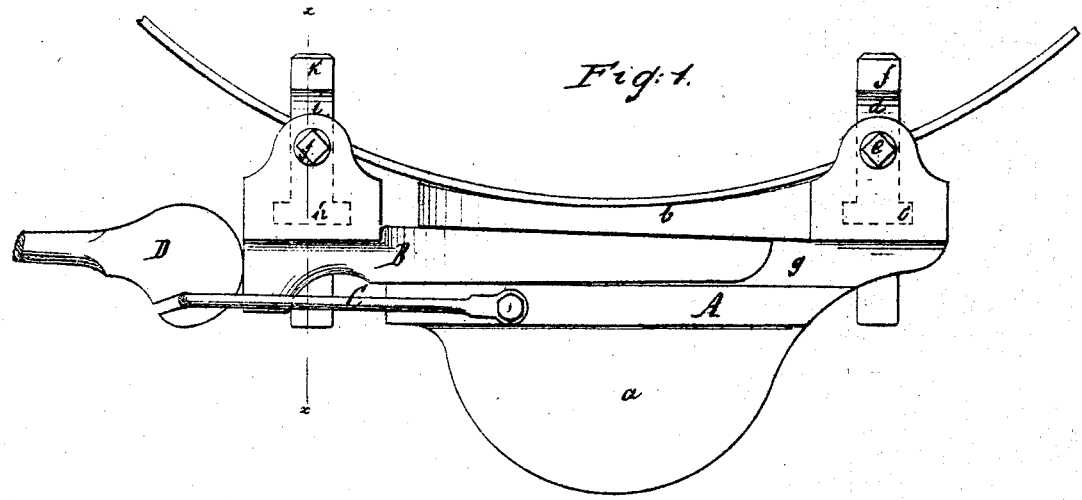
Figure 2:
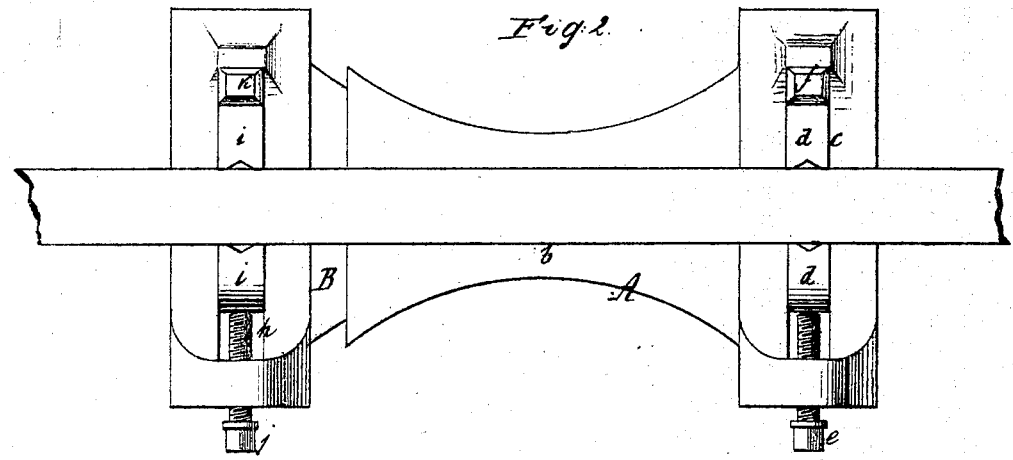
Figure 3:
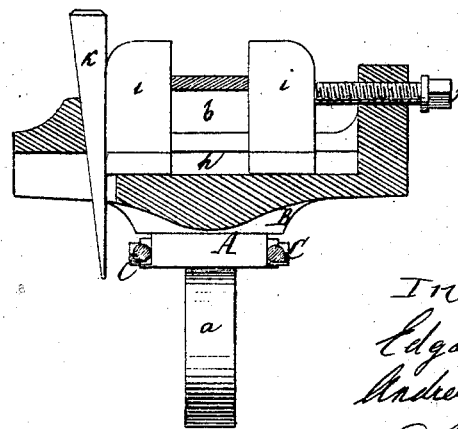

Figure 1 represents a side view of my improved apparatus. Fig. 2 is a plan or top view of the same. Fig. 3 is a transverse section of the same taken in the plane $x\ x$, Fig. 1.

Similar letters indicate corresponding parts.

This invention relates to that class of devices known as machines for upsetting tires; and consists in fitting the griping jaws loosely on transverse slides; the screws by which to adjust one jaw of both pairs toward and the other to accommodate tires of different breadths, as well as to clamp, and the wedges by which to actuate the other jaws of the two pairs, and to supplement the compressing or clamping force of the screws, the arrangement and construction of which will hereinafter more fully be set forth.

In the drawing, A designates the stock or body of our machine, which is provided with a flange, $a$, so that it can be conveniently clamped in a vise. The surface of said stock forms a concave anvil, $b$, and in one end thereof is a guide-way, $c$, to receive two jaws, $d\ d$, which are exposed to the action of a set-screw, $e$, and of a wedge, $f$. (See Figs. 2 and 3.) A suitable spring may be so applied that it has a tendency to open the jaws automatically for the reception of the tire, and by means of the set-screw the jaws are so adjusted that tires of different widths can be readily placed between them, and that a blow on the head of the wedge will clamp said tire firmly between the jaws. In the sides of the stock A are made two grooves, $g$, to form the guides for a carriage, B, in the end of which is provided a guide-way, $h$, to receive two clamping-jaws, $i\ i$, which are exposed to the action of a set-screw, $j$, and a wedge, $k$, similar in every respect to the jaws $d\ d$. To the stock A, beneath the grooves $g$, is hinged a strap, C, intended to receive the slotted head of a knuckle-lever, D, as shown in Fig. 1, so that by turning up said lever the knuckle acts against the end of the carriage B, and the jaws $i\ i$ are forced in toward the jaws $d\ d$.

In using our machine we adjust the carriage B in the position shown in Fig. 1; we then open the jaws $i\ i$ and $d\ d$ just far enough to admit the tire, leaving the wedges $f$ and $k$ in position to be driven down behind their jaws at any moment. We then heat the tire at the spot where it is to be upset, drop it between the jaws $i\ i$ and $d\ d$, and by one or more blows on the wedges said jaws are made to clamp the tire without loss of time; and after the tire has thus been secured between the jaws the knuckle-lever is raised, and thereby the jaws $i\ i$ are forced in toward the jaws $d\ d$, and the operation of upsetting the tire is effected with little trouble. During this operation the tire rests upon the anvil $b$, and if the heated portion of the tire should bulge up it can easily be hammered down while the jaws $i\ i$ are being forced in toward the jaws $d\ d$.

It will be seen that, by placing the wedges on one side of each pair of loosely-fitted jaws when the tire is placed on the concave bed preparatory to heating, and its width determined, and the jaws set in position, the tire is then removed, heated, and replaced between the jaws, so that a single blow upon the wedges will force up the jaws and clamp the tire almost instantaneously, so that no time is lost; hence the tire is prevented from cooling.

By this means a simple machine is constructed, all pivoted griping-jaws and complicated mechanism being dispensed with.

What we claim as new, and desire to secure by Letters Patent, is—

As an improvement in machines for upsetting tires, the arrangement herein described and shown, of the griping jaws, fitted loosely on transverse slides, the screws by which to adjust one jaw of both pairs toward and from the other to accommodate tires of different breadths as well as to clamp, and the wedges by which to actuate the other jaws of the two pairs, and to supplement the compressing or clamping force of the same.

EDGAR HITT.
ANDREW LENT.

Witnesses:
W. W. HORTON,
MILTON G. LENT.

(60)